3 Sheets—Sheet 1.

J. FARGUSSON.

Grain Separator.

No. 1,566.

Reissued Nov. 10, 1863.

Witnesses:
R. S. Cobbs.
H. F. Mann.

Inventor:
J. Fargusson.
by
Robt. W. Fenwick and
De Witt C. Laurence.
his attys.

N. PETERS, Photo-Lithographer, Washington, D. C.

3 Sheets—Sheet 2.

J. FARGUSSON.

Grain Separator.

No. 1,566.

Reissued Nov. 10, 1863.

*Witnesses:*
R. S. Cobbs
H. F. Mann

*Inventor:*
J. Fargusson.
by
Robt W. Fenwick &
De witt C. Lawrence.
his attys.

N. PETERS, Photo-Lithographer, Washington, D. C.

3 Sheets—Sheet 3.

J. FARGUSSON.

Grain Separator.

No. 1,566.

Reissued Nov. 10, 1863.

Witnesses:
R. L. Cobbs.
H. Fr. Mann

Inventor:
J. Fargusson
by Robt. W. Fenwick and
De Witt C. Lawrence his atty.

N. PETERS, Photo-Lithographer, Washington, D. C.

UNITED STATES PATENT OFFICE.

JAMES FARGUSSON, OF DUBUQUE, IOWA.

IMPROVEMENT IN GRAIN-SEPARATORS.

Specification forming part of Letters Patent No. 33,639, dated November 5, 1861; Reissue No. 1,566, dated November 10, 1863.

*To all whom it may concern:*

Be it known that I, JAMES FARGUSSON, of Dubuque, in the county of Dubuque and State of Iowa, have invented a new and useful Improvement in Separators for Grain and other Substances; and I do hereby declare that the following is a full, clear, and exact description of the same, reference being had to the accompanying drawings, forming part of this specification, in which—

Figure 1:
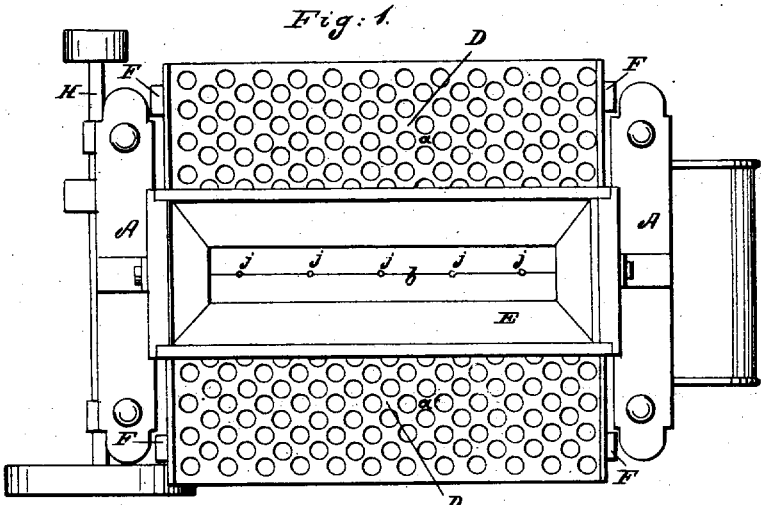
Figure 4:
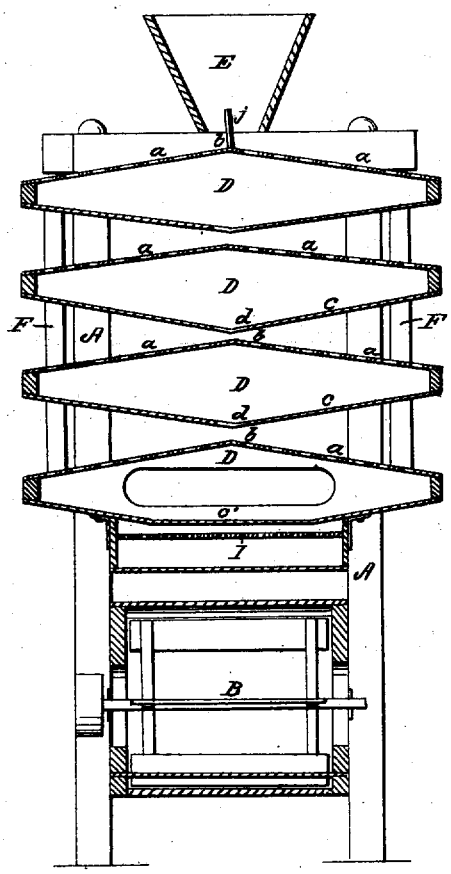
Figure 2:
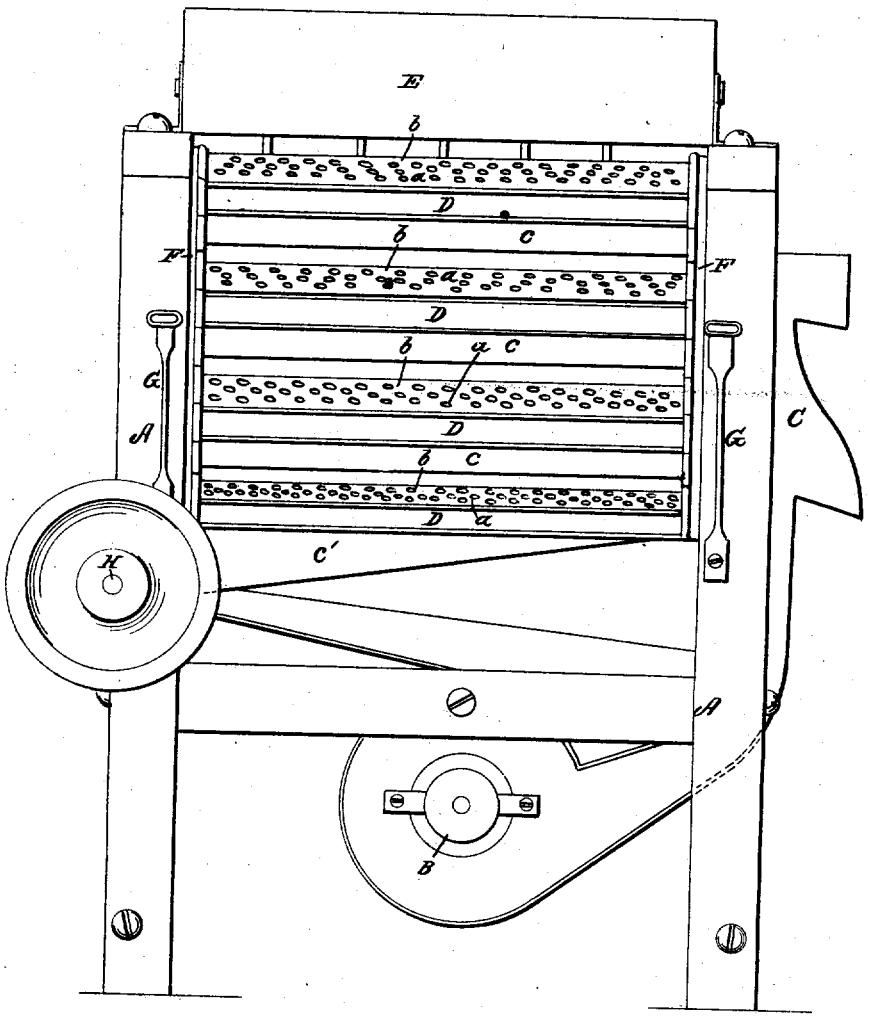
Figure 3:
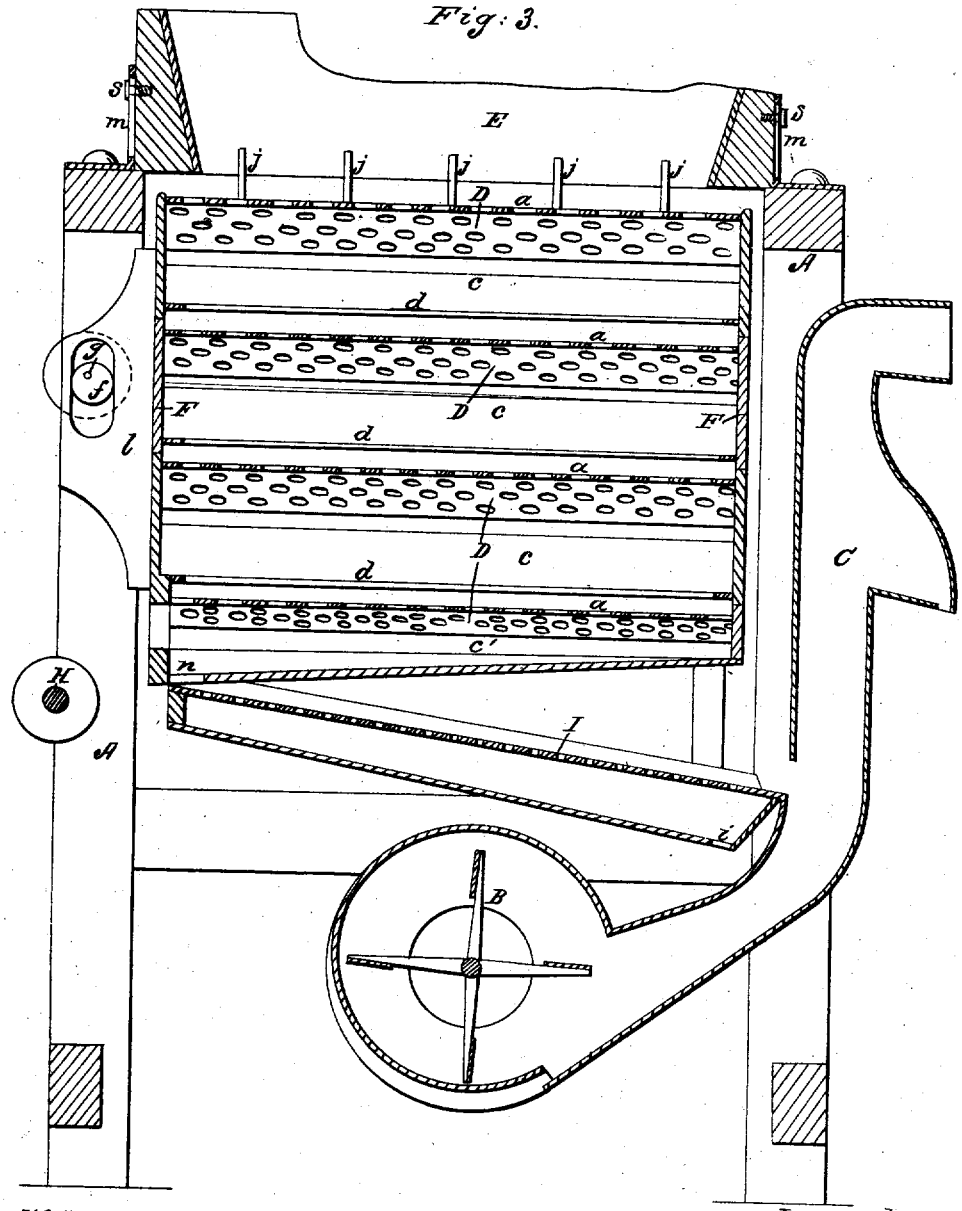

Figure 1 is a top view, Fig. 2 is a side elevation, Fig. 3 a vertical central longitudinal section, and Fig. 4 a vertical transverse section, of my improved machine.

Similar letters of reference indicate corresponding parts in the several figures.

The object of my invention in the main is to divide the quantity of grain passing over the screen or riddle, so that instead of all flowing over the whole width of the screen in one direction one half passes over one part of the screen in one direction and the other half over the other part of the screen in an opposite direction. Thus the passage of an undue amount of grain over the riddle-surface at one side of a separator is prevented, and at the same time the necessity of the grain passing over a long distance in order to separate the same quantity that I separate with my machine is obviated, and, besides this, I am enabled to separate a given amount of grain in one-half the length of time heretofore required.

The nature of my invention consists in a riddle or screen which divides the quantity of grain as it flows from the supply-hopper and screens it to a greater or less degree without the aid of a blast before it is again concentrated or brought together for a second riddling operation.

My invention further consists in a riddle or screen which not only divides the quantity of grain and screens it without the aid of a blast, but also concentrates or brings the grain together after it has been thus divided and screened by the riddle.

My invention further consists in several different combinations, hereinafter stated, of the screen or riddle above referred to with the various parts of a separator.

To enable others skilled in the art to make and use my invention, I will proceed to describe its construction and operation A represents a frame adapted for receiving and supporting a blast-fan, B, blast-spout C, riddles D D, and a hopper, E, as shown in the annexed drawings. Each riddle D consists of a perforated plate or board, *a*, and a slotted plate or board, *c*. The plate *a* gradually rises into a ridge at its middle, or thereabout, as indicated at *b*, and therefore has a slope from its middle to its edges. The plate *c* is in from the same as plate *a*, but is placed so that the slope is from its edges to its center. The plate *a* is perforated, like a sieve, all over except at its ridge *b*, but the plate *c* only has a long slot, *d*, cut in it at a point directly under the ridge *b*. These plates may be fastened into end-boards F′ F′ and have cleats *a′ a′* between their edges, or they may be otherwise suitably arranged, so long as the plate *a b* parts or divides the quantity of grain at *b* and screens or riddles it (before it falls upon *c*) to a greater or less extent, and so long as the plate *c* concentrates and discharges the grain at *d*. I, however, prefer to so connect the plates *a b c d* that box-riddles D are formed, as represented. If the plate *c* is not connected at its edges to plate *a* by means of cleats *a′* or otherwise, it is important that the edges of plate *a* be extended some distance beyond the edges of plate *c*. The riddles thus constructed are arranged one above another and connected together by means of a frame, F F. When connected, there is a space between each pair of riddles, so that the grain has a slight "fall" in passing out of one riddle upon another.

The frame of riddles is suspended within the frame A by means of the springs G or other devices, as shown in Fig. 2. The springs allow a longitudinal movement to be given to the frame of riddles.

On one end of the frame of riddles a slotted bracket, *e*, is fastened, (see Fig. 3,) and in the slot of this bracket an eccentric, *f*, revolves, the eccentric being on a rotating pulley-shaft, *g*, which may, if desirable, be connected by bands or otherwise with the driving-shaft H. By this arrangement the longitudinal reciprocating motion of the riddles is produced. Any equivalent reciprocator may be substituted for the device shown.

It will be observed that the bottom *c′* of the lowermost riddle, D, is not made with an opening at the center of its width, but it is made in its transverse section semi-elliptical, or nearly so, in form, and has a transverse passage, *n*, cut through it at one end. The object of this change is that the wheat, &c., in the last screening may descend over a large finely-perforated riddle, I, which is arranged directly between the fan and the last grain-riddle, as shown, and thus be deprived of cockle and other small seed.

The cockle-screen I empties its wheat directly into the throat of the fan-spout C, and the small seed and "screenings" of I escape outside of the fan-spout C through a passage, *i*, which is made at the lower end of the bottom board of the screen I.

The shape of the outlet to cockle-screen, as well as the shape of the lowermost riddle, may be varied to suit circumstances.

The hopper E is made without a bottom, and it is arranged centrally in a longitudinal direction over the wheat-riddles, so that the highest point of the uppermost riddle-plate, *a a*, will be in a line with the opening through the hopper. The hopper is supported at its ends by slotted brackets *m* and set-screws *s* in such a manner that it can be adjusted and set nearer to or farther from the riddles, and thus the feed can be regulated at pleasure.

The choking of the hopper is prevented by means of pins *j j*, projecting up into it from the top edge of the imperforated ridge *b* of the uppermost riddle, as represented in Figs. 1 2, 3, and 4. Instead of pins, narrow strips may be employed. There may also be pins or strips on each succeeding riddle for the purpose of insuring the flow and division of the grain.

I have represented in the accompanying drawings a blast-spout and fan-case; but it must be understood that the riddling of the grain or other substances is performed by the riddles themselves, and that the blast apparatus is to operate upon the grain only after it falls into the spout C from the screen I. The blast-spout shown has a shelf for saving light grain, which rises with the light chaff and dust; but it is obvious that any of the approved styles of vertical spouts or a suction-fan may be used instead of the spout C.

The operation of my invention is as follows: Motion being given to the shaft of the eccentric *f*, a reciprocating movement is imparted to the frame of riddles D. The grain mixed with impurities is now supplied to the bottomless hopper, and falls directly upon the highest point, *b*, of the riddle-plates *a a*. At this point it is immediately divided, so that one half of the quantity is caused to flow on one side of the machine and the other half on the opposite side. In its passage the good grain and small seeds pass through the perforations of the plates *a a*, as shown by the black arrows, while the oats, straw, &c., which are too long to escape through the perforations pass off at the lower edges of the riddles, as shown by the red arrows. Some of the foreign substances will of course pass along with the good grain through the first riddle, but this will finally be discharged over the edges of the succeeding riddles. The grain which passes through the riddling-plates *a a* falls upon the plates *c c*, and slides to the middle thereof, and escapes through the opening *d*. In its fall it comes upon the ridge *b* of a succeeding riddle, and is there divided again and subjected to the riddling operation a second time. Thus the riddling of the grain is conducted throughout the series of riddles until it reaches the bottom, *c'*, of riddle D, when it descends to one end of this bottom and escapes through the opening *n*, falling upon the inclined screen I, which separates the seed, cockle, &c., from the grain. From the screen I the grain flows into the winnowing-machine, where it is purged of its dust, &c., and delivered beneath the fan-box. The small seeds which follow the grain through the riddling process finally escape from the passage *i* near the lower end of the screen I, as above described.

From the foregoing specification it will be seen that my machine differs substantially from all separators which diffuse the grain in only one direction; also, that it differs from stationary angular plates, which are imperforated, but alternately diffuse and concentrate the grain while subjected to a blast, and likewise that it differs very essentially from all contrivances in use in its discharging the refuse at both edges of a riddle made prominent at its middle, while the grain passes through perforated plates and falls upon a concentrating-plate, thus riddling and separating without a blast. Finally, my machine differs from all others in the use of dividing ridge-pins for preventing the choking of the feed, and a bottomless adjustable hopper over the ridge, as shown.

The effect of the above-described operation is to separate without a blast the larger particles from the smaller; and in separating oats from wheat the result is most satisfactory, the latter passing directly through the riddling-plates, while the former, on account of their length, pass directly off at the edges of these plates.

My machine, as is obvious, will answer for separating other substances than grain from foreign matters, and the number of riddles and the configuration of the same may be varied and still retain the gist of my invention—to wit, dividing the substance as it flows from the hopper or from a preceding riddle and depriving it of more or less of its impurities on the riddle itself before it is concentrated or brought together again for another riddling operation.

What I claim as my invention, and desire to secure by Letters Patent, is—

1. Dividing, screening, and concentrating grain or other substances in their passage over and through one or more riddles, substantially as described.

2. The riddle-boxes D, operating in the manner substantially as described, for the purposes set forth.

3. The combination of the riddles D, springs G, and eccentric *f*, or its equivalent, substantially in the manner and for the purposes described.

4. The combination of the box-riddles D, pins, or their equivalents, *j*, and bottomless hopper E, substantially as and for the purposes described.

5. The combination of the box-riddles D and the cockle-screen I, substantially as and for the purposes described.

6. The combination of the riddles or riddle-boxes D and fan B, substantially as and for the purposes described.

7. The adjustability of the hopper E relatively to the upper riddle-box, D, substantially in the manner and for the purposes described.

JAMES FARGUSSON.

Witnesses:
JNO. M. BALLOU, Jr.,
CHARLES G. HARGUS.